Figure 4:
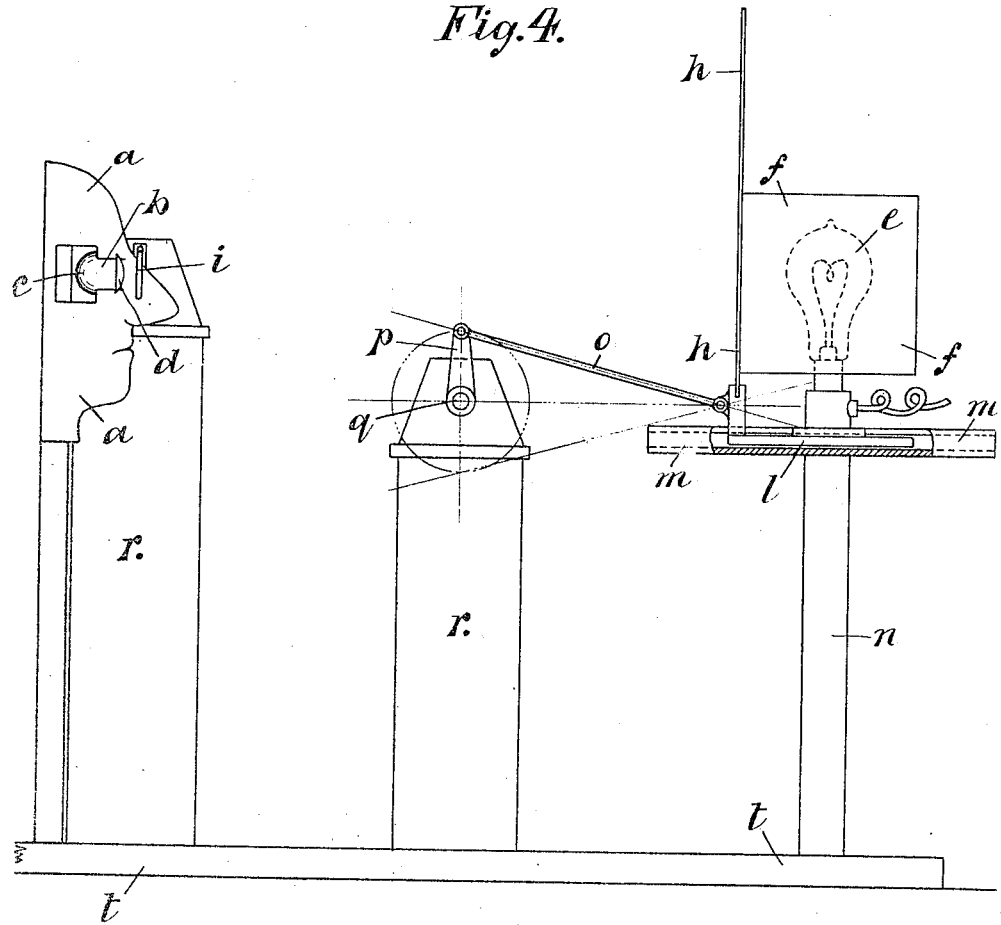

No. 837,368. PATENTED DEC. 4, 1906.
J. J. WOOD.
APPARATUS FOR INDICATING DEFECTIVE EYESIGHT.
APPLICATION FILED APR. 27, 1905.
2 SHEETS—SHEET 1
Fig.1.
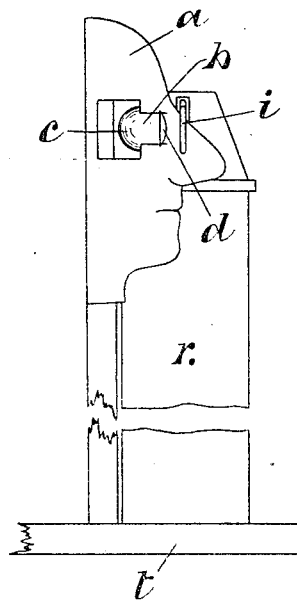
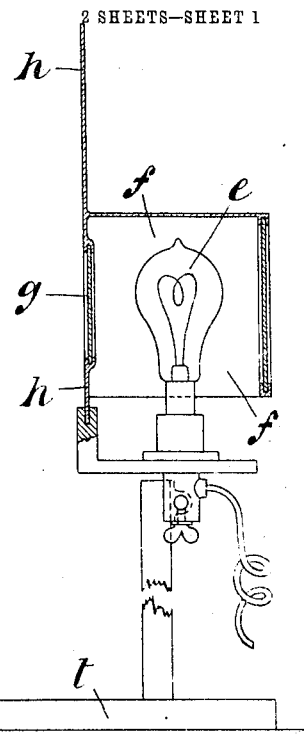
Fig.2. Fig.3.
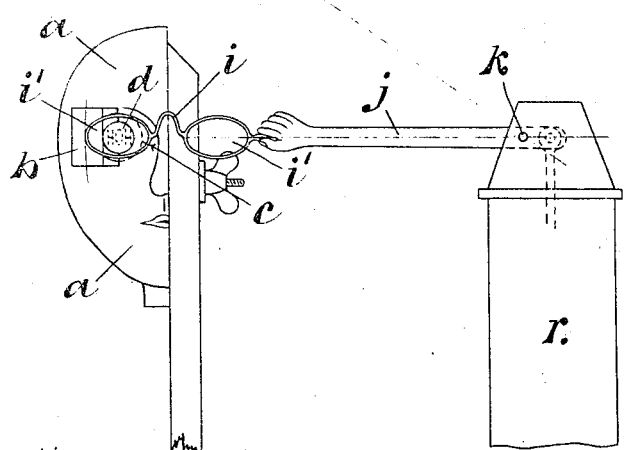
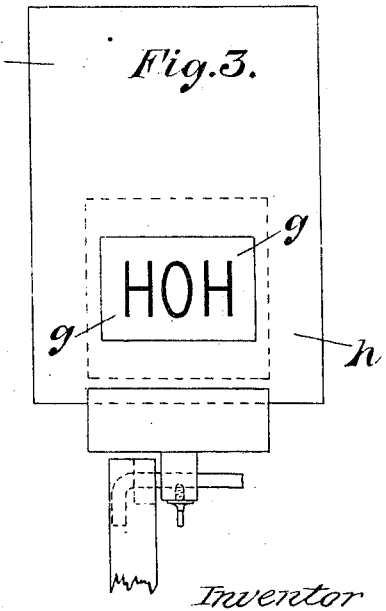
Witnesses
H. M. Kuehne
John A. Percival
Inventor
John James Wood
By Richardson
ATTORNEY No. 837,368. PATENTED DEC. 4, 1906.
J. J. WOOD.
APPARATUS FOR INDICATING DEFECTIVE EYESIGHT.
APPLICATION FILED APR. 27, 1905.

2 SHEETS—SHEET 2.

UNITED STATES PATENT OFFICE.

JOHN JAMES WOOD, OF LIVERPOOL, ENGLAND.

APPARATUS FOR INDICATING DEFECTIVE EYESIGHT.

No. 837,368.  Specification of Letters Patent.  Patented Dec. 4, 1906.

Application filed April 27, 1905. Serial No. 257,705.

*To all whom it may concern:*

Be it known that I, JOHN JAMES WOOD, a subject of the King of England, residing at 20 Lord street, Liverpool, in the county of Lancaster, England, have invented new and useful Improvements in Apparatus for Indicating Defective Eyesight, of which the following is a specification.

This invention has reference to apparatus for mechanically illustrating or indicating defects of vision and their correction by spectacles or glasses.

The invention will be described with the aid of the accompanying drawings, in which—

Figure 1 is a side elevation, partly in section, showing one form of apparatus for illustrating defective eyesight and its correction by spectacles. Fig. 2 is a front view of the part of the apparatus shown on the left-hand side of Fig. 1, and Fig. 3 is a front view of the part of the apparatus shown on the right-hand side of Fig. 1. Fig. 4 is a side elevation showing a modification for illustrating mechanically the defects of short sight and long sight.

Referring to the drawings, the apparatus comprises a model of a part of the skull $a$ of a person and having in it an aperture showing the lens and retina of the eye.

$e$ is an artificial light contained within a box $f$, having a translucent dial $g$ between the lamp and the skull $a$, the dial having upon it suitable letters or signs, which are to be thrown onto the retina portion of the eye in the skull $a$. Between the skull $a$ and the dial $g$ spectacles $i$ are introduced, they being intermittently and mechanically moved in front of and away from the eye-lens.

With regard to the skull $a$ in the side there is a cavity $b$ in it, which is open to the outside of the head. The back portion of this cavity is in the form of a concave curve $c$, while in front of the cavity is the eye-lens $d$, so placed in front of the curved surface $c$ that the objects reaching the lens are reflected onto the surface $c$ and can be seen thereon from outside.

The spectacles $i$ have an ordinary lens $i'$ and are adapted to be raised from the position as shown in full lines in Figs. 1 and 2 to a point away from the skull alternately. This movement is effected by an arm $j$, hinged at $k$, about which it is adapted to be vibrated from the horizontal position shown to a suitable angle upward and back again by any suitable kind of known mechanism. In the case shown the letters "H O H" are provided on the glass $g$, which are illuminated from behind by the electric lamp $e$, and thereby intensified. The image of these letters is received by the lens $d$ and is transmitted by it onto the retina-surface $c$, which shows them reflected on it.

To illustrate defective eyesight by the apparatus, the lens $d$ is such and so placed in relation to the retina $c$ that images received by the lens are rendered indistinct or blurred on the retina, and to illustrate the effect of utilizing proper spectacles the lens of the spectacles $i$, which must be of the required character, is caused to moved in front of the lens $d$, whereupon the image on the retina $c$, which was indistinct and confused, is at once rendered sharp and clear, and thereupon the apparatus shows and illustrates, as stated, the defects of vision and their correction by spectacles. Around the illuminated glass $g$, which, say, is a frosted glass with the figures "H O H" on it, there is a large frame $h$, preferably with a darkened surface, which assists in intensifying the image and obviating interference of the images of other surrounding objects in the lens. Thus these two states of the picture or reflection, the one blurred and the other sharp and defined, illustrates what happens to people with defective eyesight when they use proper glasses and when they do not. The skull or body $a$ and the other parts of the apparatus are all suitably mounted on a base $t$.

Referring now to Fig. 4, this apparatus may be used with or without the spectacles or glass lens to indicate and illustrate the different effects of distance of an object looked at to people with long and short sight. In this case the casing $f$, containing the lamp $e$ and front $h$ with a glass, as $g$, (shown in Figs. 1 to 3) in its face is moved nearer to and farther from the skull $a$. To effect this movement, these parts are mounted on a slide $l$, which works in a guide $m$, fixed on the standard $n$, the slide $l$ being operated by a connecting-rod $o$ and crank $p$, mounted on an axle $q$ on the frame $r$ and adapted to be suitably revolved by any known suitable means. The skull is similarly, as in the case shown in Figs. 1 to 3, provided with a chamber $b$, a lens $d$ in the front, and a concave retina-surface $c$. Assuming the lens $d$ were such and its position in relation to the retina $c$ were such that when the object were farthest away from it it would give a blurred picture or image on the retina c, which would illustrate the condition of a short-sighted person, and assuming the farther distance referred to was the normal distance, then as the object was moved nearer the lens d the image or picture on the retina would become clearer and when at its nearest point its image would be sharp and defined, and thus the apparatus would illustrate the defective eyesight or vision in the case of a short-sighted person. Conversely, if the lens d and its position in relation to the retina c were such that when the object in the plate h were nearest the lens d (which may be assumed to be the normal distance in this case) the image on the retina c is blurred and that when the object is pushed farther away by the crank p this image or picture becomes clearer or more sharp and defined then the apparatus would illustrate the effects of objects as seen nearer to and farther from the eye-lens by a person of long sight. In a case such as is shown in Fig. 4 there may be also used in connection with it spectacles, as set forth with reference to Figs. 1 to 3, by means of which there can be used and shown suitable spectacle-lenses for long and short sighted people and illustrating the effect to people using such spectacles and the effect of looking at objects at different distances.

It will be therefore seen that the apparatus can be used for several purposes connected with the illustrating of defects of vision and their correction by spectacles or glasses. Examples of such uses are that it will show how long sight can be corrected, how short sight can be corrected, the defects of wrong spectacles, the reason why an old-sighted person sees better by holding print away from him, the reason why a short-sighted person sees better by holding print quite near to him, and similar or analogous effects and purposes.

What is claimed is—

1. Apparatus for mechanically indicating defective eyesight, and the correction of same, consisting of a body a having a chamber b open from the side, and having a lens d in the front, and a receiving-surface c at the back; an object g in front of the lens d, the image of which is adapted to be received by the lens d; a lens i, and means for moving the said lens i in front of and away from the lens d between such lens and the object g.

2. Apparatus for mechanically indicating defective eyesight, and the correction of same, consisting of a body a having a chamber b open from the side, and having a lens d in the front, and a receiving-surface c at the back, an object g in front of the lens d, the image of which is adapted to be received by the lens d; a window g, having upon it the objects to be received by the lens; and an artificial light e behind the window g for intensifying the object; substantially as set forth.

3. Apparatus for mechanically indicating defective eyesight, and the correction of same, consisting of a body a having a chamber b open from the side, and having a lens d in the front, and a receiving-surface c at the back; an object g in front of the lens d, adapted to be received by the lens d, and movable up to and away from the lens d; and means connected with said object for so moving it nearer to and farther from the lens; substantially as set forth.

In testimony whereof I have signed my name to this specification in the presence of two subscribing witnesses.

JOHN JAMES WOOD.

Witnesses:
S. GOODALL,
W. HARRISON.